US009069722B2

(12) United States Patent
Li

(10) Patent No.: US 9,069,722 B2
(45) Date of Patent: *Jun. 30, 2015

(54) NUMA-AWARE SCALING FOR NETWORK DEVICES

(71) Applicant: Intel Corporation, Santa Clara, CA (US)

(72) Inventor: Yadong Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/895,917

(22) Filed: May 16, 2013

(65) Prior Publication Data

US 2013/0326000 A1 Dec. 5, 2013

Related U.S. Application Data

(63) Continuation of application No. 12/640,083, filed on Dec. 17, 2009, now Pat. No. 8,446,824.

(51) Int. Cl.
| | |
|---|---|
| H04L 12/56 | (2006.01) |
| H04L 29/02 | (2006.01) |
| G06F 15/173 | (2006.01) |
| G06F 13/00 | (2006.01) |

(Continued)

(52) U.S. Cl.
CPC .......... *G06F 15/17331* (2013.01); *H04L 45/00* (2013.01); *H04L 49/9036* (2013.01)

(58) Field of Classification Search
CPC ............. G06F 9/50; G06F 9/52; G06F 9/526; G06F 9/3004; G06F 9/4812; G06F 9/5016; G06F 9/5027; G06F 9/5066; G06F 12/084; G06F 12/0842; G06F 12/0844; G06F 12/1018; G06F 12/0802; G06F 12/0811; G06F 12/0866; G06F 12/0897; G06F 13/16; G06F 13/18; G06F 13/24; G06F 2212/62; G06F 2212/2542; G06F 2212/6012; H04L 47/10; H04L 47/125; H04L 47/522; H04L 47/621–47/622; H04L 47/2408; H04L 47/6295; H04L 49/90; H04L 49/9036; H04L 12/5693; H04L 45/00; H04L 45/38
USPC .......... 370/229–240, 412–429; 709/212–216, 709/230–245; 711/117–125, 147–153
See application file for complete search history.

(56) References Cited

U.S. PATENT DOCUMENTS

| | | | | |
|---|---|---|---|---|
| 5,768,599 | A | * | 6/1998 | Yokomizo ...................... 710/260 |
| 6,760,809 | B2 | * | 7/2004 | Arimilli et al. ................ 711/119 |

(Continued)

OTHER PUBLICATIONS

Wang et al., "Practice of Parallelizing Network Applications on Multi-core Architectures", Proceedings of the 23rd international conference on Supercomputing, Jun. 8-12, 2009, pp. 204-213.

(Continued)

*Primary Examiner* — Tri H Phan

(57) ABSTRACT

The present disclosure describes a method and apparatus for network traffic processing in a non-uniform memory access architecture system. The method includes allocating a Tx/Rx Queue pair for a node, the Tx/Rx Queue pair allocated in a local memory of the node. The method further includes routing network traffic to the allocated Tx/Rx Queue pair. The method may include designating a core in the node for network traffic processing. Of course, many alternatives, variations and modifications are possible without departing from this embodiment.

17 Claims, 3 Drawing Sheets

(51) Int. Cl.
*H04L 12/701* (2013.01)
*H04L 12/861* (2013.01)

(56) References Cited

U.S. PATENT DOCUMENTS

| | | | |
|---|---|---|---|
| 6,785,888 B1* | 8/2004 | McKenney et al. | 718/104 |
| 6,901,485 B2* | 5/2005 | Arimilli et al. | 711/135 |
| 7,248,585 B2* | 7/2007 | Kohn et al. | 370/392 |
| 7,369,557 B1* | 5/2008 | Sinha | 370/392 |
| 7,443,878 B2 | 10/2008 | Hendel et al. | |
| 7,493,409 B2 | 2/2009 | Craddock et al. | |
| 7,529,242 B1* | 5/2009 | Lyle | 370/392 |
| 7,529,875 B2 | 5/2009 | Karamatas et al. | |
| 7,567,567 B2 | 7/2009 | Muller et al. | |
| 7,574,567 B2 | 8/2009 | Wyman | |
| 7,584,286 B2 | 9/2009 | Goglin et al. | |
| 7,715,428 B2 | 5/2010 | Basso et al. | |
| 7,788,464 B2* | 8/2010 | Sheu et al. | 711/207 |
| 7,843,926 B1 | 11/2010 | Muller et al. | |
| 7,865,624 B1 | 1/2011 | Hendel et al. | |
| 7,921,686 B2 | 4/2011 | Bagepalli et al. | |
| 7,992,144 B1 | 8/2011 | Hendel et al. | |
| 8,009,682 B2* | 8/2011 | Gopinath et al. | 370/401 |
| 8,018,961 B2* | 9/2011 | Gopinath et al. | 370/413 |
| 8,245,008 B2* | 8/2012 | Kaminski et al. | 711/172 |
| 8,346,999 B2 | 1/2013 | Dubal et al. | |
| 8,446,824 B2* | 5/2013 | Li | 370/230.1 |
| 8,918,596 B2* | 12/2014 | Dice et al. | 711/151 |
| 2005/0053057 A1 | 3/2005 | Deneroff et al. | |
| 2005/0086401 A1* | 4/2005 | Connor | 710/48 |
| 2009/0006521 A1 | 1/2009 | Veal et al. | |
| 2009/0007150 A1 | 1/2009 | Li et al. | |
| 2009/0055831 A1 | 2/2009 | Bauman et al. | |
| 2009/0089505 A1 | 4/2009 | Vasudevan et al. | |
| 2009/0240874 A1* | 9/2009 | Pong | 711/105 |
| 2012/0131309 A1* | 5/2012 | Johnson et al. | 712/41 |

OTHER PUBLICATIONS

Blake, et al., "A Survey of Multicore Processors", IEEE Signal Processing Magazine, Nov. 2009, pp. 26-37.
Casazza, "First the Tick, Now the Tack: Intel® Microarchitecture (Nehalem)", Intel® Xeon® processor 3500 and 5500 series, 2009, 8 Pages.
Dobrescu, et al., "RouteBricks:Exploiting Parallelism to scale software routers", Proceedings of the ACM SIGOPS 22nd symposium on Operating systems principles, Oct. 11-14, 2009, Big Sky, Montana, USA, pp. 15-28.
Guo, et al., "A scalable multithreaded L7-filter design for Multi-Core Servers", Proceedings of the 4th ACM/IEEE Symposium on Architectures for Networking and Communications Systems, Nov. 6-7. 2008, San Jose, California, pp. 60-68.
Luck. "Linux Scalability in a NUMA world", Sep. 2008, 5 Pages.
"NUMA: Theory and Practice", webpage retrieved on Nov. 3, 2009, 7 available at: http://practical-tech.com/infrastructure/numa-theory-and-practice/.
Makineni, et al., "Receive Side Coalescing for Accelerating TCP/IP Processing", Intel Corporation, 2006, 17 Pages.
"Receive-Side Scaling Enhancements in Windows Server 2008", Nov. 5, 2008, 18 Pages.
"Intel® 82599 10 GbE Controller Datasheet", Intel Corporation, Jul. 2009, 820 Pages.
Li, Yadong, "Numa-Aware Scaling for Network Devices", U.S. Appl. No. 12/640,083, filed Dec. 17, 2009, 18 pages.
Non-Final office Action Received for U.S. Appl. No. 12/640,083, mailed on Sep. 25, 2012, 9 pages.
Notice of Allowance received for U.S. Patent Application No. 8,446,824 mailed on Feb. 6, 2013, 11 pages.

* cited by examiner

NUMA-AWARE SCALING FOR NETWORK DEVICES

REFERENCE TO RELATED APPLICATIONS

This application is a continuation of, and claims priority to, U.S. patent application Ser. No. 12/640,083 filed on Dec. 17, 2009, the teachings of which are incorporated herein by reference in their entirety.

FIELD

The present disclosure relates to NUMA-aware scaling for high speed network devices.

BACKGROUND

Multi-processor systems may be configured for generally uniform memory access or non-uniform memory access. Symmetric multi-processor (SMP) systems may include generally uniform memory access by each processor in the system, i.e., memory access time ("latency") for processors in the system may be generally uniform. In non-uniform memory access (NUMA) architecture multi-processor systems, memory access time may be non-uniform, i.e., may depend on whether the memory being accessed is local to or remote from the processor that is accessing the memory.

NUMA, on the other hand, is configured for non-uniform access to memory. In a NUMA system, a node, including a processor, may be associated with a node local memory. The processor within a node may have lower latency access to the memory that is local to that node (node local memory) as compared to access to a remote, i.e., non-local, memory. In a NUMA system, the processor in a node may be coupled to remote memory through one or more processors not in the node, i.e., in another node. Remote memory accesses may therefore result in a relatively higher latency than local memory accesses. Accordingly, in a NUMA system local memory accesses may provide an improvement in system performance while remote memory accesses may degrade system performance.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to distributing network traffic across one or more nodes in a non-uniform memory access ("NUMA") architecture system. At least one transmit/receive queue pair ("Tx/Rx Queue pair") may be allocated for a node in node local memory. The Tx/Rx Queue pair(s) is configured to store transmit and/or receive packets for packet flow(s) associated with application(s) assigned to core(s) in the node. A network adapter is configured to route received packets associated with a packet flow identifier to the same Tx/Rx Queue pair in which transmit packets associated with the packet flow identifier may be stored. A core in the node may be designated for receiving interrupts associated with the packet flow(s) associated with the network application(s).

In this manner, packet(s) associated with an application assigned to a core in a node may be stored in node local memory and may be processed by a core in the node, thus avoiding remote memory accesses and cacheline thrashing between nodes. Allocating Tx/Rx Queue pair(s) per node rather than per core is configured to reduce a total number of Tx/Rx Queue pair(s) allocated in system, reducing an amount of memory allocated, which also reduces its associated cache footprint.

Figure 1:
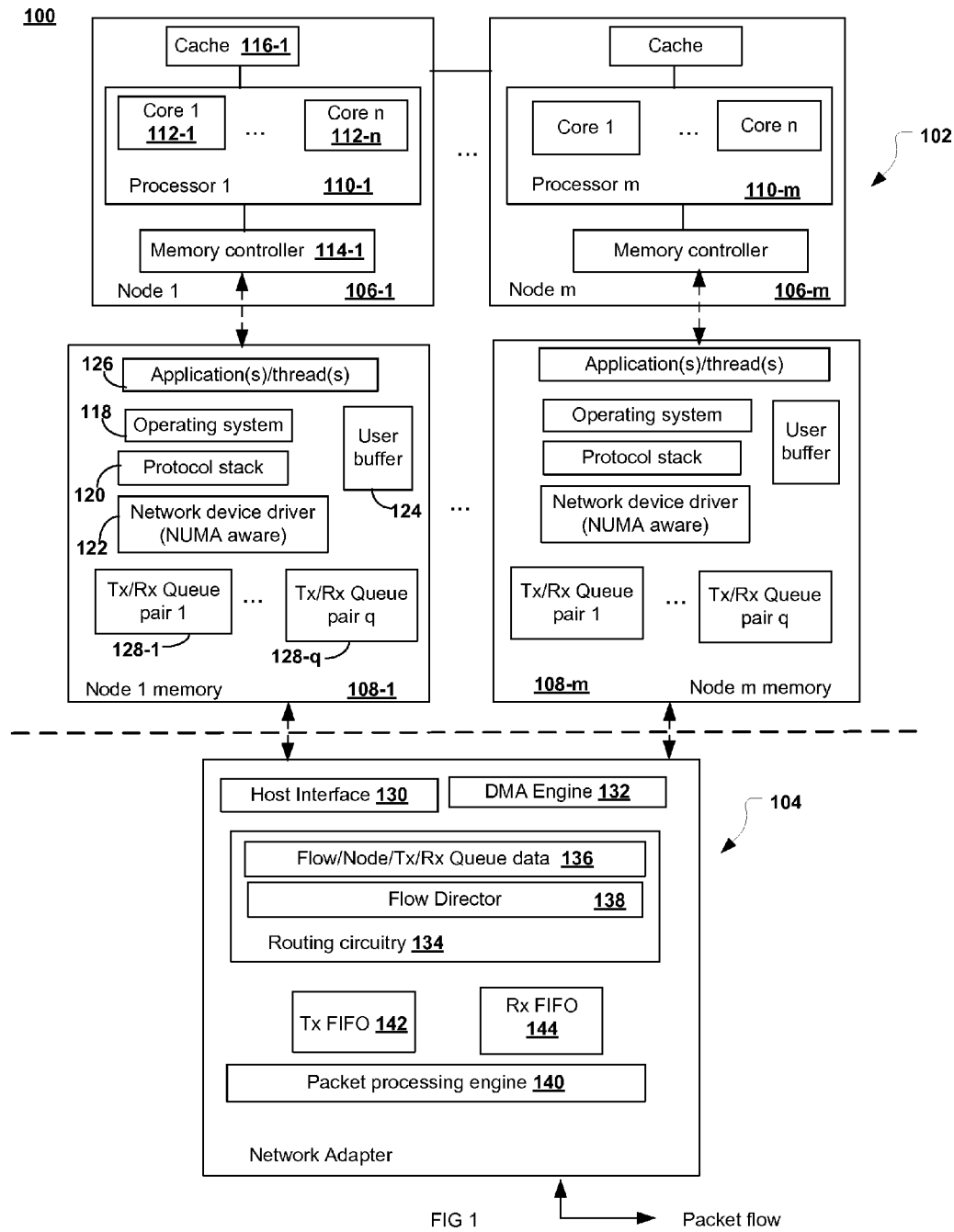
FIG. 1 illustrates one exemplary NUMA system embodiment consistent with the present disclosure.

FIG. 1 illustrates one exemplary system embodiment consistent with the present disclosure. NUMA system 100 of this embodiment generally includes a host system 102 and a network adapter 104 in communication with the host system 102. The host system 102 of this embodiment includes a plurality of nodes 106-1, . . . , m and a plurality of node memories 108-1, . . . , 108-m. Each respective node 106-1, . . . , 106-m may be "directly" coupled to a respective node memory 108-1, . . . , 108-m ("node local memory"). As used herein, "directly" means without another node between the respective node and the respective node local memory, e.g., Node 1 memory is node local memory with respect to Node 1. Each node, e.g., node 106-1 may be coupled to another node, e.g., node 106-m. A node memory coupled to a first node through a second node is "remote memory" with respect to the first node. For example, Node m memory is remote memory with respect to Node 1. Memory accesses to node local memory may be relatively faster (lower latency) than memory accesses to remote memory.

For clarity, with respect to FIG. 1, Node 1 and Node 1 memory will be described. As will be understood by those of ordinary skill in the art, a similar description applies to other node(s) and node memories in the NUMA system. Node 1 may include a processor 110-1, a memory controller 114-1 and a cache memory 116-1. The processor 110-1 may include at least one core processing unit (hereinafter "core"), generally labeled Core 1, . . . , Core n. The cache memory 116-1 may be coupled to the processor 110-1. The memory controller 114-1 is configured to couple one or more cores 112-1, . . . , 110-m in the processor 110-1 to Node 1 memory (node local memory).

Each node memory 108-1, . . . , 108-m may host operating system code 118, a protocol stack 120, network device driver code 122, a user buffer 124 and a plurality of application(s)/thread(s). The user buffer 124 may be configured for storing data and/or message(s). For example, data and/or message(s) extracted from received packets may be stored in user buffer 124 after protocol stack processing, for consumption by an application and/or thread. Device driver 122, when executed, is configured to control, at least in part, the operation of network adapter 104, as will be explained in greater detail below.

Each node memory 108-1, ..., 108-*m* may further host one or more Tx/Rx Queue pairs 128-1, ..., 128-*q*. A number of Tx/Rx Queue pairs may be allocated based on a speed of a network adapter and/or a speed of a communication link. For example, for a 10 Gbps network adapter, one Tx/Rx Queue pair may be allocated per node. In another example, for a 20 Gbps network adapter, one or two Tx/Rx Queue pairs may be allocated per node. In yet another example, for a 40 Gpbs network adapter, two or four Tx/Rx Queue pairs may be allocated per node. As the speed of a network adapter and/or communication link increases, the number of allocated Tx/Rx Queue pairs per node may also increase. The one or more Tx/Rx Queue pairs may be shared by application(s)/thread(s) running on processing units in the node.

Figure 2:
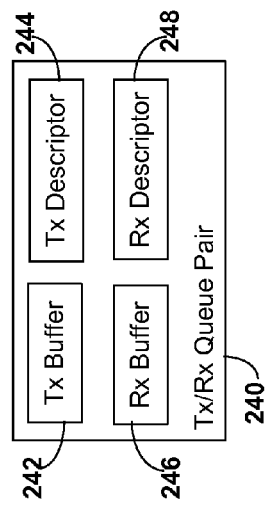
FIG. 2 illustrates an example of a transmit/receive queue pair ("Tx/Rx Queue pair")

FIG. 2 illustrates an exemplary Tx/Rx Queue pair 240 consistent with the present disclosure. The Tx/Rx Queue pair 240 may include a transmit buffer 242, configured for storing packets for transmission and a transmit descriptor 244 configured for storing, e.g., pointers associated with the packets stored in the transmit buffer 242. The Tx/Rx Queue pair 240 may include a receive buffer 246, configured for storing received packets prior to protocol stack processing and a receive descriptor 248 configured for storing, e.g., pointers associated with the packets stored in the receive buffer 246.

Turning again to FIG. 1, one or more application(s) and/or thread(s) in a node local memory may be assigned to each core 112-1, ..., 112-*n* in a node. For example, an application in Node 1 memory (node local memory for Node 1) may be assigned to Core 1 in Node 1, meaning Core 1 has the primary responsibility for executing instructions and exchanging commands and data related to this application. It should be noted that at least one application running in each node memory 108-1, ..., 108-*m* may include a "network application", meaning that such an application involves receiving and/or sending packets from/to the network adapter 104. Of course, other system applications, including non-network applications, may be running in each node memory 108-1, ..., 108-*m*.

An application and/or thread may be configured to send and/or receive data and/or message(s) to and/or from a network. The data and/or message(s) may be put into packets for transmission or may be extracted from received packets, by for example, a network application. Content and configuration of network traffic may depend on a network and/or communication protocol, e.g., TCP/IP, UDP, etc. Network traffic may include one or more packet flows. Normally, a packet flow includes one or more fields that permit identification. For example, the packet flow ID for a TCP packet may include a sequence of source IP address, destination IP address, source port number, and destination port number, L2/L4 data, etc., any of which can be used to ID the packet flow.

Network adapter 104 may include memory and/or circuitry. Network adapter 104 may include a host interface 130, configured to communicate with host system 102. Network adapter 104 may include a DMA engine 132 configured to transfer packets to and/or from node memory by direct memory access, i.e., without using a core in a node. Network adapter 104 may include routing circuitry 134. Routing circuitry 134 is configured to store packet flow, node and/or Tx/Rx Queue data 136. These data 136 may associate a packet flow with a node and with a Tx/Rx Queue pair stored in the node local memory. These data 136 are configured to facilitate routing packets associated with a packet flow identifier to the Tx/Rx Queue pair associated with the packet flow. The Tx/Rx Queue pair may be allocated in node local memory for an application assigned to a core in the node.

Routing circuitry 134 may include a flow director 138 configured to process received packets to identify a packet flow and an associated node and/or Tx/Rx Queue pair for the identified packet flow. For example, when an application/thread running on a processing unit in Node 1 has data/message(s) to transmit and packets corresponding to the data/message(s) are stored in a transmit buffer of a Tx/Rx Queue pair in Node 1 memory 108-1, the network device driver 122 may be configured to program flow director 138 to route received network traffic for the same packet flow to the same Tx/Rx Queue pair.

Network adapter 104 may include a packet processing engine 140, configured to process packets for transmission on a network and/or to process packets received from the network. Network adapter 104 may include one or more transmit buffers Tx FIFO 142 and one or more receive buffers Rx FIFO 144. These buffers 142, 144 may be configured to store packets awaiting transmission and received packets awaiting processing by, e.g., packet processing engine 140, respectively.

For example, application(s)/thread(s) 126 stored in Node 1 memory 108-1 may be configured to run on one or more cores in Node 1. At initialization, a Tx/Rx Queue pair, e.g., Tx/Rx Queue pair 1, may be allocated and enabled in Node 1 memory 108-1. A core, e.g., Core 1, may be designated for receiving interrupts related to network traffic and/or network traffic processing for the node (Node 1). Node, Tx/Rx Queue pair data 136 and designated processing unit data may be provided to and stored in routing circuitry 134 of network adapter 114.

Continuing with this example, when an application and/or thread, running on a core in Node 1, has data/message(s) to transmit, the data/message(s) may be processed into packets by the protocol stack 120 and placed in the transmit buffer 242 of the allocated Tx/Rx Queue pair in node local memory (e.g., Tx/Rx Queue pair 1 in Node 1 memory). The transmit descriptor 244 may be updated. The network device driver 122 running on a core in Node 1 may inform the network adapter 104 that transmit packets are available in Tx/Rx Queue pair 1 of Node 1 memory. The transmit packets may be associated with a packet flow. The flow director 138 may be programmed to provide received packets for the packet flow to Tx/Rx Queue pair 1 of Node 1 memory. In this manner, an application and/or thread may be running on a core in a node, transmit packets from and received packets for the application and/or thread may be stored in a Tx/Rx Queue pair in the node local memory and a core in the node may be designated for interrupt processing and/or network traffic processing.

Figure 3:
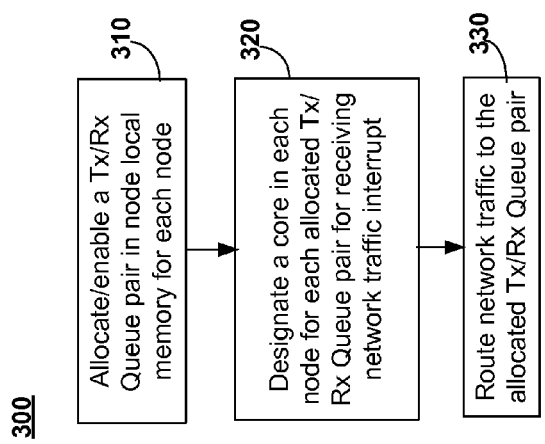
FIG. 3 depicts an exemplary flow chart illustrating NUMA-aware processing consistent with the present disclosure.

FIG. 3 is a flow chart 300 for distributing network traffic processing in a NUMA system. FIG. 3 may be better understood when viewed in combination with FIG. 1. A Tx/Rx Queue pair may be allocated/enabled 310 in node local memory for each node in the NUMA system. For example, a Tx/Rx Queue pair may be allocated in a respective node local memory for each respective node, e.g., in Node 1 memory for Node 1, ..., Node *m* memory for Node *m*. A core in each node for each allocated Tx/Rx Queue pair may then be designated 320 for network traffic interrupt processing. For example, core 1, in at least some respective nodes 106-1, ..., 106-*m* may be designated for the network traffic interrupt processing. Network traffic may then be routed 330 to the allocated Tx/Rx Queue pair. For example, a flow director, e.g., flow director 136, may be configured to route received network traffic based, at least in part, on the packet flow ID, the Tx/Rx Queue pair associated with transmit packets for the packet flow and the node associated with node local memory that includes the Tx/Rx Queue pair.

Figure 4:
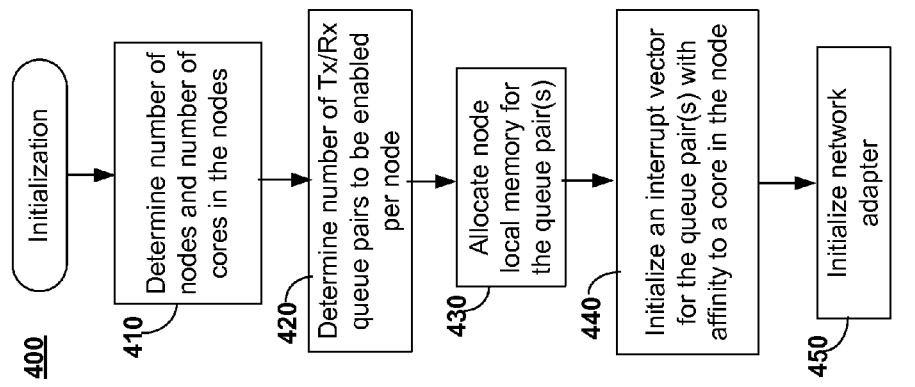
FIG. 4 depicts an exemplary flow chart illustrating an initialization program flow consistent with the present disclosure.

FIG. 4 is an exemplary flow chart 400 for initializing a NUMA system for network traffic processing consistent with the present disclosure. A number of nodes and a number of cores in the nodes may be determined 410. A number of Tx/Rx Queue pairs to be enabled (allocated) per node may then be determined 420. For example, as described herein, the number of Tx/Rx Queue pairs may be determined based, at least in part, on a speed of a connection and/or a speed of a network adapter. Node local memory may then be allocated 430 for the Tx/Rx Queue pair(s). An interrupt vector for the respective allocated Tx/Rx Queue pair(s) may then be initialized 440 with affinity to a core in the respective node. For example, one core in the node may process interrupts for network traffic for application(s) and/or thread(s) running on core(s) in the node. A network adapter may then be initialized 450. For example, routing circuitry in the network adapter may be initialized with node and/or Tx/Rx Queue data.

Figures 5, 6:
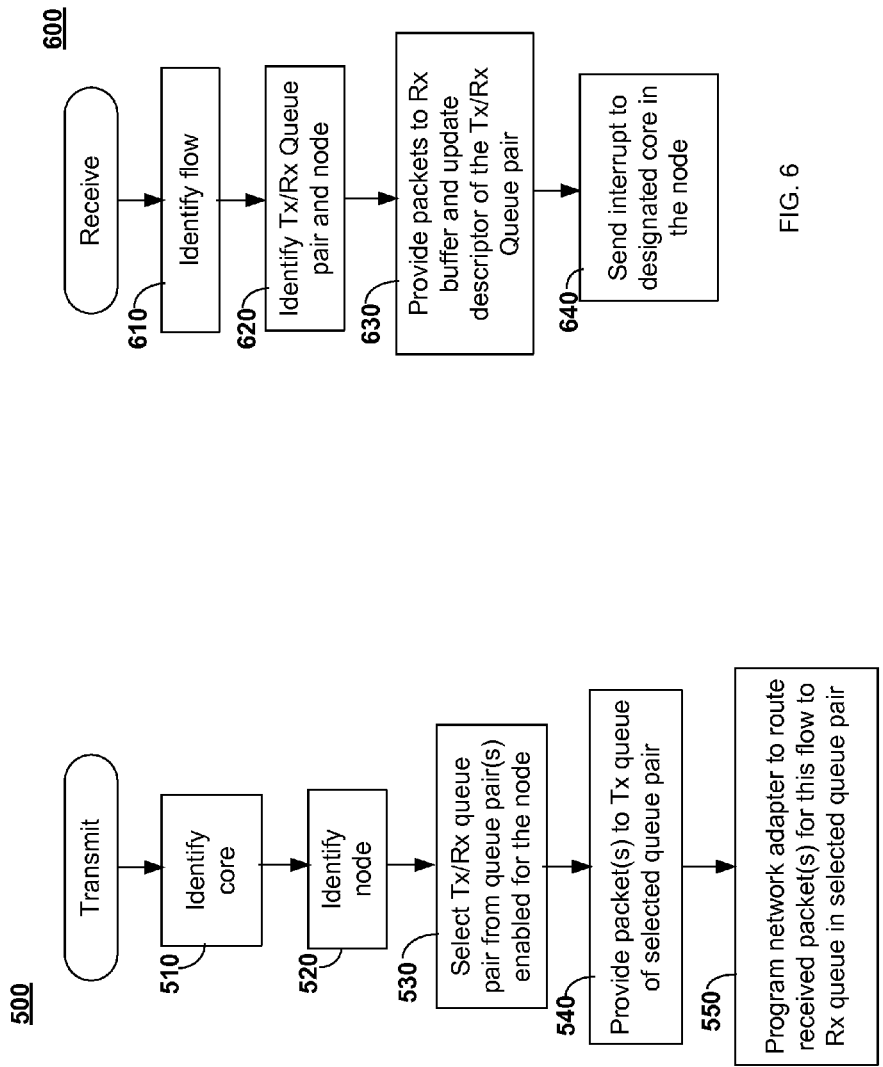
FIG. 5 depicts an exemplary flow chart illustrating a transmit program flow consistent with the present disclosure.
FIG. 6 depicts an exemplary flowchart illustrating a receive program flow consistent with the present disclosure.

FIG. 5 is an exemplary flow chart 500 for program flow when an application and/or thread has data and/or message(s) to transmit. A core may be identified 510. The core may be running the application/thread that has data and/or a message to transmit. A node may then be identified 520. The node may include the core that was identified in operation 510. For example, an application running on Core n of Node 1 may have data to transmit. A Tx/Rx Queue pair from Tx/Rx Queue pair(s) in node local memory assigned to (enabled for) the node may then be selected 530. For example, a Tx/Rx Queue pair in Node 1 memory and enabled for Node 1 may be selected. Packets corresponding to the data and/or message(s) may be provided 540 to the transmit queue of the selected Tx/Rx Queue pair. The network adapter may then be programmed 550 to route received packets for a packet flow associated with the transmit packets to a receive queue in the selected Tx/Rx Queue pair.

FIG. 6 is an exemplary flow chart 600 for program flow when packets are received at a network adapter. Packet flow may be identified 610. An associated Tx/Rx Queue pair may then be identified 620. For example, a flow director, e.g., flow director 138 of FIG. 1, may process a received packet to determine the packet flow ID. The flow director may then identify the associated node and Tx/Rx Queue pair based, at least in part, on data, e.g., data 136, stored in the network adapter. For example, data 136 may include packet flow ID, node and Tx/Rx Queue data for a packet flow that associates a node, node local memory and/or Tx/Rx Queue with the packet flow. The node may include a core executing an application and/or thread configured to provide and/or consume data/message(s) to/from the identified packet flow. The node local memory may be configured to store transmit and/or received packets for the packet flow. The transmit and/or received packets may be stored in a Tx/Rx Queue pair allocated in the node local memory. The received packets may then be provided 630 to an Rx buffer and an Rx descriptor may be updated of the Tx/Rx Queue pair in a local memory of the associated node. An interrupt may then be sent 640 to the designated core in the associated node. In this manner, received packets may be processed in the same node as transmit packets for a packet flow and the packets may be stored in node local memory for the node.

As described herein, one or more Tx/Rx Queue pairs may be allocated and enabled in node local memory for a node. If one Tx/Rx Queue pair is allocated in node local memory for a node, the Tx/Rx Queue pair may be shared by application(s)/thread(s) running on one or more cores in the node. If a plurality of Tx/Rx Queue pairs are allocated/enabled in node local memory for a node and there are more cores than there are Tx/Rx Queue pairs, the plurality of Tx/Rx Queue pairs may be shared by application(s)/thread(s) running on the cores in the node. For example, when an application and/or thread has data to transmit, a Tx/Rx Queue pair may be selected using a round robin scheme. In another example, the Tx/Rx Queue pair may be selected based, at least in part, on load balancing, i.e., selecting the Tx/Rx Queue pair based on a storage load associated with each Tx/Rx Queue pair in the node local memory of the node. Storage load may include a frequency of accessing a Tx/Rx Queue pair for storage and/or retrieval of packets and/or a level of packets stored in a Tx/Rx Queue pair. Load balancing may be configured to balance packet storage across the plurality of allocated Tx/Rx Queue pairs in the node local memory of the node.

The Tx/Rx Queue pair may be selected using a form of load balancing similar to Receive Side Scaling (RSS). RSS is a Microsoft® Windows® operating system ("OS") technology configured to allow a network processing load from a network adapter to be balanced (distributed) across multiple processing units based on each processing unit's processing load. For example, a Tx/Rx Queue pair of the plurality of Tx/Rx Queue pairs allocated in the node local memory may be selected using a hashing algorithm based on a packet flow ID. For example, the hashing algorithm may be a Toeplitz algorithm. A TCP 5-tuple and/or a field in a packet may be used in the hashing algorithm. In another example, RSS may be configured to distribute network traffic processing across at least some of the cores in the node.

If a Tx/Rx Queue pair is being shared by a plurality of cores, spinlock may be possible. To avoid spinlock, a "lockless queue" may be implemented. For example, a virtual Tx/Rx Queue pair may be defined for each application and/or thread running on each core in the node. The virtual Tx/Rx Queue pair may be a software data structure configured to temporarily store an application and/or thread's transmit and/or receive packet(s). One thread may be selected as a "master thread" using, e.g., an atomic operation. The master thread may be configured to transfer network traffic from the virtual Tx/Rx Queue pair(s) to the shared Tx/Rx Queue pair in node local memory for the node. In this manner, spinlock may be avoided.

As further described herein, a core in a node may be designated for interrupt processing related to network traffic. Generally, the designated core may also be configured to perform network traffic processing, e.g., protocol stack processing, i.e., may be configured to execute a network application. It is contemplated that in some embodiments, based, at least in part, on an amount of network traffic, network traffic processing may be distributed across cores in a node. For example, a core may be selected using a round robin scheme. In another example, a core may be selected, based at least in part, on the core's processing load, using, e.g., RSS. In yet another example, a core may be assigned to a Tx/Rx Queue pair. In this example, processing network traffic associated with a particular Tx/Rx Queue pair may be performed by the core assigned to the Tx/Rx Queue pair. Distributing the storage load across a plurality of Tx/Rx Queue pairs may result in distributed network traffic processing across cores in a node assigned to the Tx/Rx Queue pairs allocated in node local memory for the node.

While the foregoing is prided as exemplary system architectures and methodologies, modifications to the present disclosure are possible. For example, an operating system 118 in each node local memory may manage system resources and control tasks that are run on, e.g., system 100. For example, OS 118 may be implemented using Microsoft Windows, HP-UX, Linux, or UNIX, although other operating systems may be used. In one embodiment, OS 118 shown in FIG. 1 may be replaced by a virtual machine which may provide a layer of abstraction for underlying hardware to various operating systems running on one or more processing units.

Operating system 118 may implement one or more protocol stacks, e.g., protocol stack 120. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated subsystem such as, for example, a TCP offload engine.

Other modifications are possible. For example, node memory, e.g., Node 1 memory 108-1 and/or memory associated with the network adapter, e.g., network adapter 104, may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, node memory 108-1, . . . , m and/or memory associated with network adapter 104 may comprise other and/or later-developed types of computer-readable memory.

Embodiments of the methods described herein may be implemented in a system that includes one or more storage mediums having stored thereon, individually or in combination, instructions that when executed by one or more processors perform the methods. Here, the processor may include, for example, a processing unit and/or programmable circuitry in the network adapter. Thus, it is intended that operations according to the methods described herein may be distributed across a plurality of physical devices, such as processing structures at several different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

The Ethernet communications protocol, described herein, may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system comprising one or more storage mediums having stored thereon, individually or in combination, instructions that when executed by one or more processors cause the one or processors to:
   automatically allocate a single respective receive queue per respective set of multiple sets of multiple processor cores, each single respective receive queue to enqueue respective entries for respective received network packets based on a hash of multiple header fields of the respective received network packets; and
   for each respective set of the sets of multiple processor cores, cause designation of a single respective core of the multiple processor cores to receive interrupts and cause an interrupt vector to be set with affinity to the single respective core.

2. The system of claim 1, wherein at least one set of the multiple sets of multiple processor cores comprises a NUMA (Non-Uniform Memory Access) node.

3. A system, comprising:
   multiple sets of multiple processor cores; and
   a network adapter; and
   a network adapter device driver comprising one or more storage mediums having stored thereon, individually or in combination, instructions that when executed by one or more processors cause the one or more processors to:
      automatically allocate a single respective receive queue per respective set of multiple sets of multiple processor cores, each single respective receive queue to enqueue respective entries for respective received network packets based on a hash of multiple header fields of the respective received network packets; and
      for each respective set of the sets of multiple processor cores, cause designation of a single respective core of the multiple processor cores to receive interrupts and cause an interrupt vector to be set with affinity to the single respective core.

4. The system of claim 2, wherein at least one set of the multiple sets of multiple processor cores comprises a NUMA (Non-Uniform Memory Access) node.

5. The system of claim 3, wherein the network adapter comprises a DMA (Direct Memory Access) engine to write packet data to a memory and wherein the multiple header fields comprise an Internet Protocol source address, Internet Protocol destination address, a Transmission Control Protocol source port, and a Transmission Control Protocol destination port of each respective network packet.

6. A system comprising one or more storage mediums having stored thereon, individually or in combination, instructions that when executed by one or more processors cause the one or more processors to:
   determine a same number of receive queues per respective set of multiple sets of multiple processor cores, each respective receive queue to enqueue respective entries for respective received network packets based on a hash of multiple network packet header fields of the respective received network packets; and
   allocate the determined same number of receive queues per respective set of multiple processor cores.

7. The system of claim 6, wherein at least one set of the multiple sets of multiple processor cores comprises a NUMA (Non-Uniform Memory Access) node.

8. The system of claim 6, wherein the number of receive queues consists of a single respective receive queue per set of multiple processor cores.

9. The system of claim 6, wherein the instructions that when executed by one or more processors cause the one or more processors to determine a same number of receive queues per respective set of multiple sets of multiple processor cores comprise instructions that when executed by one or more processors cause the one or more processors to determine the same number of receive queues per respective set of multiple sets of multiple processor cores based on system processor architecture.

10. The system of claim 6, wherein the instructions that when executed by one or more processors cause the one or more processors to determine a same number of receive queues per respective set of multiple sets of multiple processor cores comprise instructions that when executed by one or more processors cause the one or more processors to determine the same number of receive queues per respective set of multiple sets of multiple processor cores based on a speed of a communication link.

11. The system of claim 6, wherein the number of receive queues consists of two receive queues per set of multiple processor cores.

12. A system, comprising:
multiple sets of multiple processor cores; and
a network adapter; and
a network adapter device driver comprising one or more storage mediums having stored thereon, individually or in combination, instructions that when executed by one or more processor cause the one or more processors to:
determine a same number of receive queues per respective set of multiple sets of multiple processor cores, each respective receive queue to enqueue respective entries for respective received network packets based on a hash of multiple network packet header fields of the respective received network packets; and
allocate the determined same number of receive queues per respective set of multiple processor cores.

13. The system of claim 12, wherein at least one set of the multiple sets of multiple processor cores comprises a NUMA (Non-Uniform Memory Access) node.

14. The system of claim 12, wherein the number of receive queues consists of a single respective receive queue per set of multiple processor cores.

15. The system of claim 12, wherein the instructions that when executed by one or more processors cause the one or more processors to determine a same number of receive queues per respective set of multiple sets of multiple processor cores comprise instructions that when executed by one or more processors cause the one or more processors to determine the same number of receive queues per respective set of multiple sets of multiple processor cores based on system processor architecture.

16. The system of claim 12, wherein the instructions that when executed by one or more processors cause the one or more processors to determine a same number of receive queues per respective set of multiple sets of multiple processor cores comprise instructions that when executed by one or more processors cause the one or more processors to determine the same number of receive queues per respective set of multiple sets of multiple processor cores based on a speed of a communication link.

17. The system of claim 12, wherein the number of receive queues consists of two receive queues per set of multiple processor cores.

* * * * *